US009378603B2

(12) United States Patent
Seino

(10) Patent No.: US 9,378,603 B2
(45) Date of Patent: Jun. 28, 2016

(54) KEYLESS ENTRY SYSTEM

(71) Applicant: ALPS ELECTRIC CO., LTD., Tokyo (JP)

(72) Inventor: Katsuhiro Seino, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 17 days.

(21) Appl. No.: 14/512,993

(22) Filed: Oct. 13, 2014

(65) Prior Publication Data

US 2015/0145646 A1 May 28, 2015

(30) Foreign Application Priority Data

Nov. 27, 2013 (JP) ................................ 2013-244740

(51) Int. Cl.
*G11B 9/00* (2006.01)
*G07C 9/00* (2006.01)

(52) U.S. Cl.
CPC .. *G07C 9/00309* (2013.01); *G07C 2009/00793* (2013.01); *G07C 2209/64* (2013.01)

(58) Field of Classification Search
CPC .. G07C 9/00; G07C 9/00166; G07C 9/00896; G07C 9/00039; G07C 9/00007; G06K 7/10; G08G 1/017
USPC ............... 340/5.2–5.7, 5.61–5.63, 5.64, 5.67, 340/5.65
See application file for complete search history.

(56) References Cited

U.S. PATENT DOCUMENTS 8,427,289 B2 * 4/2013 Ghabra ................... B60R 25/24 340/426.36
8,766,769 B2 * 7/2014 Lange ..................... E05B 81/14 340/5.61
2001/0028296 A1 * 10/2001 Masudaya .......... G07C 9/00309 340/5.61
2004/0113765 A1 * 6/2004 Suitsu ................. B60C 23/0408 340/445
2007/0109093 A1 * 5/2007 Matsubara ......... G07C 9/00309 340/5.61
2007/0222557 A1 * 9/2007 Yoshimura .......... B60R 25/2063 340/5.72
2007/0279300 A1 * 12/2007 Schindler ................ B60R 25/00 343/711
2008/0048827 A1 * 2/2008 Nakasato ............ B60R 25/2027 340/5.61
2008/0048829 A1 * 2/2008 Nakajima ............. B60R 25/245 340/5.72
2008/0068128 A1 * 3/2008 Ghabra ................. B60R 25/245 340/5.61
2010/0265032 A1 * 10/2010 Nonaka ................. B60R 25/045 340/5.61
2011/0115605 A1 * 5/2011 Dimig ....................... B60L 1/00 340/5.61
2012/0293302 A1 * 11/2012 Matsumoto ............. B60R 16/00 340/5.61
2014/0210592 A1 * 7/2014 Van Wiemeersch ...... G07C 9/00309 340/5.61
2015/0310684 A1 * 10/2015 Ederle ..................... B60R 25/24 340/5.61

FOREIGN PATENT DOCUMENTS

JP 2003-269023 9/2003
JP 2009-19439 1/2009

* cited by examiner

*Primary Examiner* — Allen T Cao
(74) *Attorney, Agent, or Firm* — Beyer Law Group LLP

(57) ABSTRACT

A keyless entry system includes an on-vehicle unit which is mounted in a vehicle, and a mobile device which is able to perform radio communication with the on-vehicle unit. The keyless entry system controls on-vehicle equipment mounted in the vehicle through radio communication between the on-vehicle unit and the mobile device. The on-vehicle unit has a plurality of LF transmission antennas (transmission antennas) for radio-transmitting a signal to the mobile device, and at least one of the plurality of LF transmission antennas is arranged in the vehicle interior of a door of the vehicle and is attached such that radiating magnetic flux passes through the window of the vehicle.

3 Claims, 8 Drawing Sheets

KEYLESS ENTRY SYSTEM

CLAIM OF PRIORITY

This application claims benefit of Japanese Patent Application No. 2013-244740 filed on Nov. 27, 2013, which is hereby incorporated by reference.

BACKGROUND OF THE INVENTION

1. Field of the Invention

The present invention relates to a keyless entry system, and in particular, to a keyless entry system capable of extending a communication distance on the outside of a vehicle.

2. Description of the Related Art

A keyless entry system which can perform vehicle operation, such as locking and unlocking of the doors of the vehicle, through radio communication between an on-vehicle unit mounted in a vehicle and a mobile device carried by a user of the vehicle without using a mechanical key has spread.

Typically, in the keyless entry system, the on-vehicle unit radio-transmits a signal having a frequency (30 kHz to 300 kHz) in a low frequency (LF) band to the mobile device, and the mobile device radio-transmits a signal having a frequency (300 MHz to 3 GHz) in an ultrahigh frequency (UHF) band to the on-vehicle unit corresponding to the signal having a frequency in the LF band, whereby radio communication is performed between the on-vehicle unit and the mobile device.

In the keyless entry system, on-vehicle equipment, such as a door locking device, is controlled through radio communication between the on-vehicle unit and the mobile device, whereby vehicle operation, such as locking and unlocking of the doors of the vehicle, can be performed. Unlocking of the doors of the vehicle is automatically performed when the user carries the mobile device and approaches the vicinity of the doors of the vehicle. Locking of the doors of the vehicle is automatically performed when the user carries the mobile device and moves away from the vicinity of the doors of the vehicle.

As the keyless entry system, a smart keyless entry system 100 (keyless entry system) described in Japanese Unexamined Patent Application Publication No. 2009-19439, a smart entry system 200 (keyless entry system) described in Japanese Unexamined Patent Application Publication No. 2003-269023, or the like has been suggested. FIG. 7 is an explanatory view showing the configuration of the smart keyless entry system 100 described in Japanese Unexamined Patent Application Publication No. 2009-19439. FIG. 8 is an explanatory view showing the configuration of the smart entry system 200 described in Japanese Unexamined Patent Application Publication No. 2003-269023.

As shown in FIG. 7, the smart keyless entry system 100 described in Japanese Unexamined Patent Application Publication No. 2009-19439 includes an on-vehicle device 110 (on-vehicle unit) which is mounted in a vehicle 130, and a mobile device 120 which is carried by a passenger.

The on-vehicle device 110 has a plurality of LF transmission antennas 112*a* to 112*e* for radio-transmitting a signal to the mobile device 120, a UHF receiver 114 which receives a signal radio-transmitted from the mobile device 120, a control device (not shown) which causes a plurality of LF transmission antennas 112*a* to 112*e* to radio-transmit various signals and controls on-vehicle equipment based on the signal received by the UHF receiver 114, and an alarm device 154 which gives an alarm when there is an abnormality.

The LF transmission antenna 112*a* is arranged in the vehicle interior of a front passenger seat side door 134, the LF transmission antenna 112*b* is arranged in the vehicle interior of a rear door 136, the LF transmission antenna 112*c* is arranged in the vehicle interior of a driver seat side door 138, the LF transmission antenna 112*d* is arranged on the front side of the front passenger seat, and the LF transmission antenna 112*e* is arranged below a vehicle interior rear seat 140. Each of the LF transmission antennas 112*a* to 112*e* forms a magnetic field therearound and radio-transmits a signal to the mobile device 120 using the formed magnetic field.

The mobile device 120 has a lock switch 124*a* and an unlock switch 124*b* for instructing locking and unlocking of the doors of the vehicle 130. Though not shown, the mobile device 120 has a reception magnetic field detection circuit which receives a signal having a frequency in an LF band radio-transmitted from the on-vehicle device 110, a UHF transmission circuit which radio-transmits a signal having a frequency in a UHF band to the on-vehicle device 110 through a UHF transmission antenna, and a control device which controls the UHF transmission circuit.

In the smart keyless entry system 100, a signal having a frequency in an LF band is radio-transmitted from the on-vehicle device 110 to the mobile device 120, and a signal having a frequency in a UHF signal is radio-transmitted from the mobile device 120 to the on-vehicle device 110, whereby radio communication is performed between the on-vehicle device 110 and the mobile device 120, and on-vehicle equipment mounted in the vehicle 130 is controlled through radio communication between the on-vehicle device 110 and the mobile device 120.

As shown in FIG. 8, the smart entry system 200 described in Japanese Unexamined Patent Application Publication No. 2003-269023 includes an on-vehicle device 220 (on-vehicle unit) which is mounted in a vehicle 201, and a mobile device 210 which is carried by a user.

The on-vehicle device 220 has a control unit 221, a door knob antenna 222, a trunk antenna 223, a vehicle interior antenna 224, and an automatic locking distance switch 230. The control unit 221 controls various on-vehicle devices. The automatic locking distance switch 230 is a switch for designating the length of the automatic locking distance.

The door knob antenna 222 is provided in the door knob of a door of the vehicle 201, the trunk antenna 223 is provided in the knob of a trunk of the vehicle 201, and the vehicle interior antenna 224 is provided at a predetermined position in the vehicle interior. Each of the door knob antenna 222, the trunk antenna 223, and the vehicle interior antenna 224 forms a magnetic field therearound and radio-transmits a signal having a frequency in an LF band to the mobile device 210 using the formed magnetic field.

Though not shown, the mobile device 210 has UHF transmission means for radio-transmitting a signal having a frequency in a UHF band to the on-vehicle device 220, LF reception means for receiving the signal having a frequency in the LF band radio-transmitted from the on-vehicle device 220, a switch for instructing locking and unlocking of the doors of the vehicle 201, and a control circuit which controls the entire mobile device 210.

In the smart entry system 200, a signal having a frequency in an LF band is radio-transmitted from the on-vehicle device 220 to the mobile device 210, and a signal having a frequency in a UHF band is radio-transmitted from the mobile device 210 to the on-vehicle device 220, whereby radio communication is performed between the on-vehicle device 220 and the mobile device 210, and on-vehicle equipment mounted in the vehicle 201 is controlled through radio communication between the on-vehicle device 220 and the mobile device 210.

SUMMARY OF THE INVENTION

In the keyless entry system, for example, when the user takes out baggage after getting out of the vehicle, each time the user slightly moves away from or approaches the vehicle, locking and unlocking of the doors of the vehicle is repeated, and the baggage is not easily taken out. For this reason, it is desirable that locking of the doors of the vehicle is not performed until the user completely moves away from the vehicle. To this end, it is necessary to extend the communication distance between the on-vehicle unit and the mobile device on the outside of the vehicle.

However, in the smart keyless entry system 100 described in Japanese Unexamined Patent Application Publication No. 2009-19439, all LF transmission antennas 112*a* to 112*e* are arranged inside the vehicle. Typically, since the surface of the vehicle 130 excluding a window portion is covered with a conductive member, such as metal, the forming of a magnetic field on the outside of the vehicle 130 by the LF transmission antennas 112*a* to 112*e* is likely to be suppressed by the shielding effect of the conductive member. For this reason, it is difficult to extend the communication distance between the on-vehicle device 110 and the mobile device 120 outside the vehicle 130.

In the smart entry system 200 described in Japanese Unexamined Patent Application Publication No. 2003-269023, since the door knob antenna 222 is provided in the door knob of the vehicle 201 (outside the vehicle), a magnetic field is easily formed on the outside of the vehicle 201, and as a result, it is possible to extend the communication distance between the on-vehicle device 220 and the mobile device 210 on the outside of the vehicle 201. However, in the smart entry system 200, the door knob should be designed in consideration of the volume, weight, or the like of the door knob antenna 222, and the degree of freedom for design of the door knob is degraded.

The invention provides a keyless entry system capable of extending a communication distance on the outside of a vehicle while maintaining the degree of freedom for design of a door knob of the vehicle.

A keyless entry system according to an aspect of the invention includes an on-vehicle unit which is mounted in a vehicle, and a mobile device which is able to perform radio communication with the on-vehicle unit. The keyless entry system controls on-vehicle equipment mounted in the vehicle through radio communication between the on-vehicle unit and the mobile device. The on-vehicle unit has a plurality of transmission antennas for radio-transmitting a signal to the mobile device, and at least one of the plurality of transmission antennas is arranged in the vehicle interior of a door of the vehicle and is attached such that radiating magnetic flux passes through the window of the vehicle.

In the keyless entry system having the above-described configuration, at least one of a plurality of transmission antennas is arranged in the vehicle interior of the door of the vehicle and is attached such that the radiating magnetic flux passes through the window of the vehicle. For this reason, it is possible to form a magnetic field on the outside of the vehicle by the magnetic flux radiated to the outside of the vehicle through the window of the vehicle. Then, it is possible to extend a communication distance on the outside of the vehicle using the magnetic field formed on the outside of the vehicle. In the keyless entry system having the above-described configuration, since the communication distance on the outside of the vehicle is extended using the transmission antenna arranged in the vehicle interior of the door of the vehicle, it is not necessary to provide a transmission antenna in the door knob. As a result, in the keyless entry system having the above-described configuration, it is possible to extend the communication distance on the outside of the vehicle while maintaining the degree of freedom for design of the door knob of the vehicle.

In the keyless entry system according to the aspect of the invention, at least one of the plurality of transmission antennas may be arranged between an outer wall and an inner wall of a left door of the vehicle, at least one of the plurality of transmission antennas may be arranged between an outer wall and an inner wall of a right door of the vehicle, and the radiation direction of the magnetic flux radiated from the transmission antenna arranged between the outer wall and the inner wall of the left door and the transmission antenna arranged between the outer wall and the inner wall of the right door may be a direction inclined upward with respect to a direction toward the front of the vehicle.

Typically, the front window (the window on the front side) of the vehicle is arranged in the upper portion on the front side of the vehicle. For this reason, when the transmission antenna arranged between the outer wall and the inner wall of the left door of the vehicle and the transmission antenna arranged between the outer wall and the inner wall of the right door radiate magnetic flux in the direction toward the front side of the vehicle, a majority of radiated magnetic flux is directed toward the lower side than the front window of the vehicle, and the amount of magnetic flux to be radiated to the outside of the vehicle decreases. However, in the keyless entry system having the above-described configuration, the transmission antennas arranged in the vehicle interior of the left door and the vehicle interior of the right door radiate magnetic flux in a direction inclined upward with respect to a direction toward the front side of the vehicle. For this reason, it is possible to increase the amount of magnetic flux to be radiated to the outside of the vehicle through the front window of the vehicle and to easily extend the communication distance on the outside of the vehicle.

In the keyless entry system according to the aspect of the invention, an inclination angle of the radiation direction of the magnetic flux with respect to a direction toward the front of the vehicle may be in a range of 20 degrees to 40 degrees.

In the keyless entry system having the above-described configuration, if the inclination angle of the radiation direction of magnetic flux radiated from the transmission antenna arranged between the outer wall and the inner wall of the left door of the vehicle and the transmission antenna arranged between the outer wall and the inner wall of the right door with respect to the direction toward the front side of the vehicle is excessively small, a majority of magnetic flux radiated from the transmission antennas is directed toward the lower side than the front window of the vehicle, and the amount of magnetic flux to be radiated to the outside of the vehicle decreases. In particular, when the inclination angle is less than 20 degrees, the tendency is conspicuous.

If the inclination angle is excessively large, a majority of magnetic flux radiated from the transmission antennas is directed toward the upper side than the front window of the vehicle, and the amount of magnetic flux to be radiated to the outside of the vehicle decreases as well. In particular, when the inclination angle is greater than 40 degrees, the tendency is conspicuous. For this reason, it is desirable that the inclination angle of the radiation direction of magnetic flux radiated from the transmission antennas with respect to the direction toward the front side of the vehicle is in a range of 20 degrees to 40 degrees.

DESCRIPTION OF THE PREFERRED EMBODIMENTS

Figure 1:
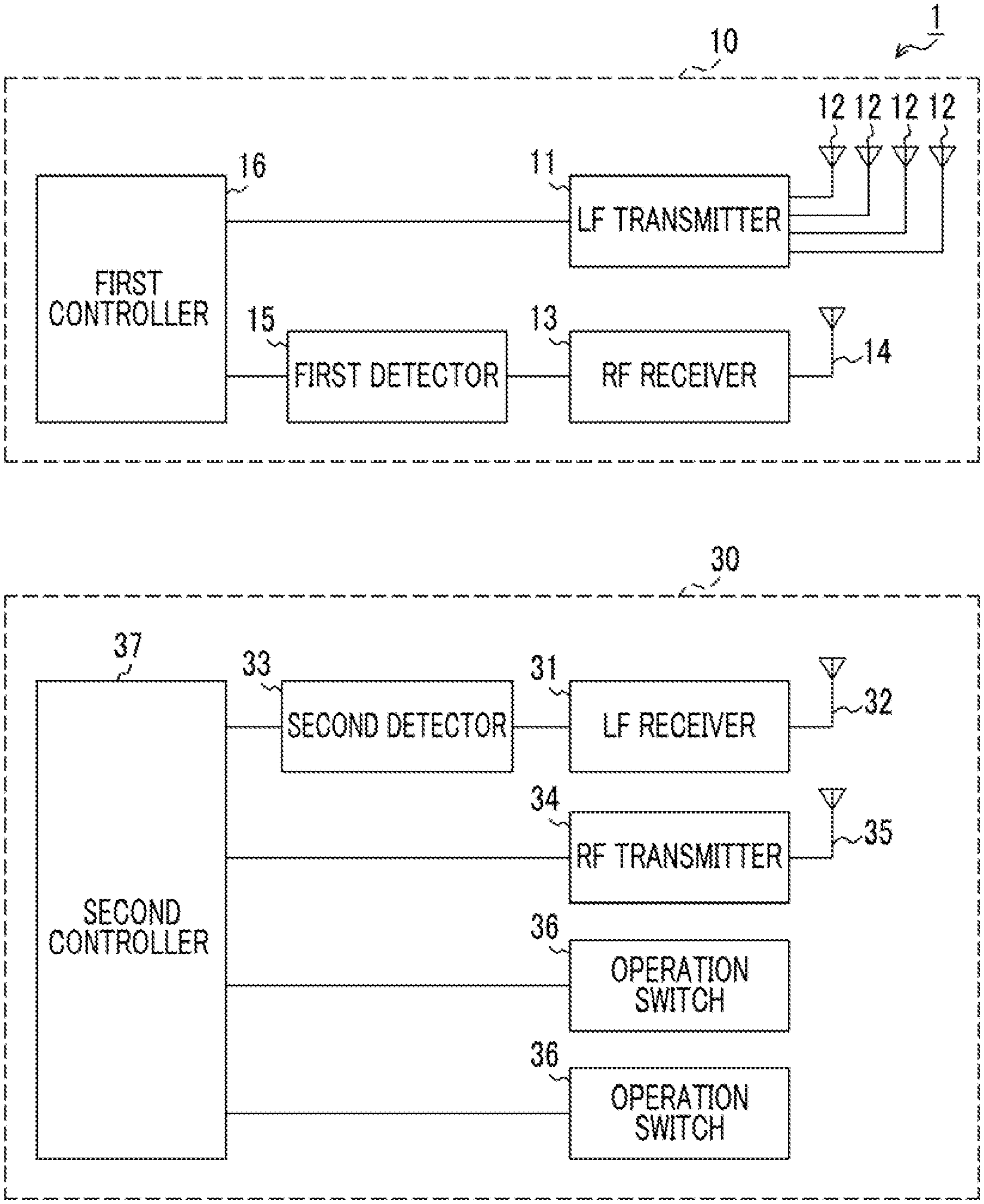
FIG. 1 is a block diagram showing the configuration of a keyless entry system 1 according to an embodiment of the invention.

Hereinafter, an embodiment of the invention will be described referring to the drawings. In the respective drawings, description will be provided while an X1 direction is referred to as a left direction, an X2 direction is referred to as a right direction, a Y1 direction is referred to as a forward direction, a Y2 direction is referred to as a backward direction, a Z1 direction is referred to as an upward direction, and a Z2 direction is referred to as a downward direction.

Figure 2:
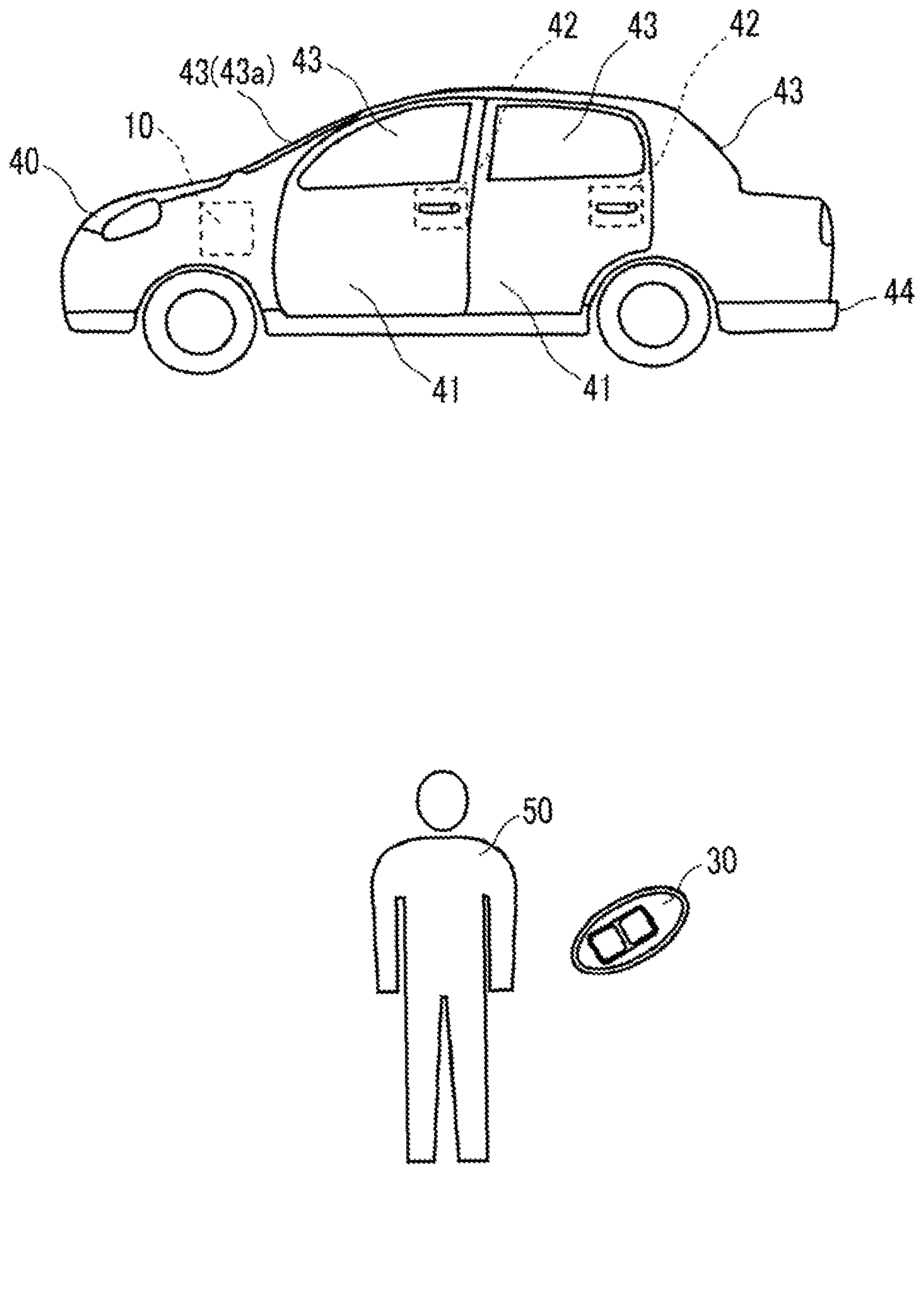
FIG. 2 is an explanatory view showing a use example of the keyless entry system 1 shown in FIG. 1.
Figure 3A:
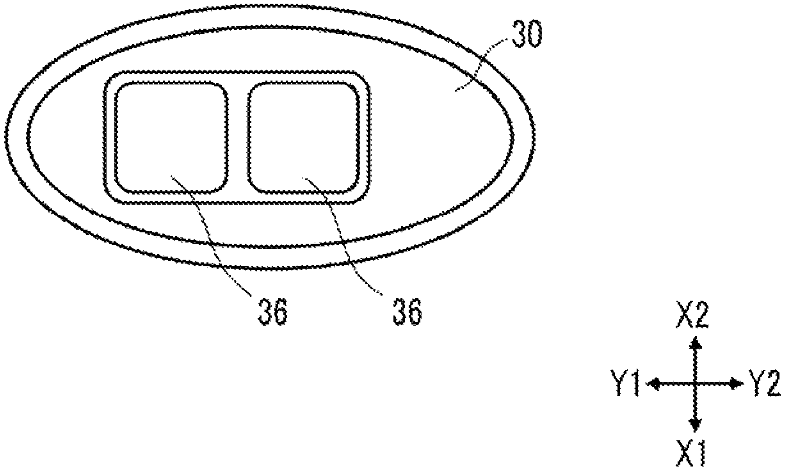
FIGS. 3A and 3B are explanatory views schematically showing the structure of a mobile device 30 shown in FIG. 1.
Figure 3B:
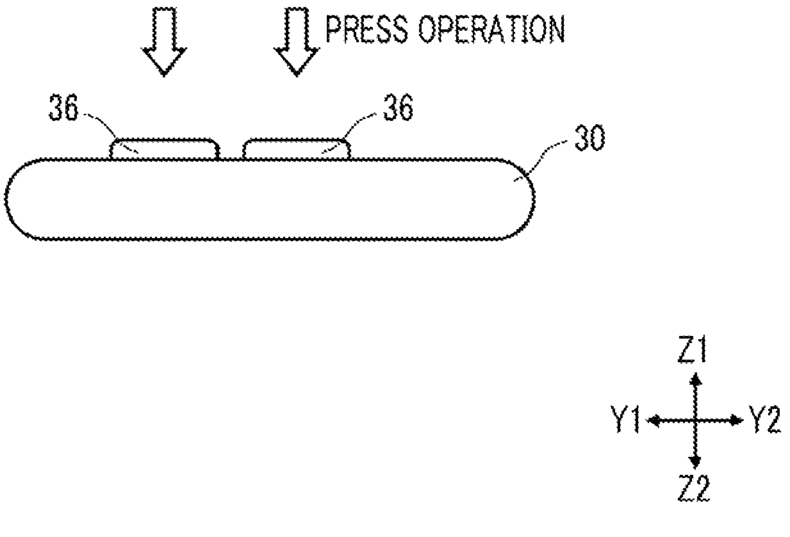

First, the configuration of a keyless entry system 1 according to the embodiment of the invention will be described referring to FIGS. 1 to 3A and 3B. FIG. 1 is a block diagram showing the configuration of the keyless entry system 1 according to the embodiment of the invention. FIG. 2 is an explanatory view showing a use example of the keyless entry system 1 shown in FIG. 1. FIGS. 3A and 3B are explanatory views schematically showing the structure of a mobile device 30 shown in FIG. 1. FIG. 3A is a top view and FIG. 3B is a side view.

As shown in FIG. 1, the keyless entry system 1 includes an on-vehicle unit 10 and a mobile device 30. As shown in FIG. 2, the on-vehicle unit 10 is mounted in a vehicle 40. The mobile device 30 is carried by a user 50 of the vehicle 40. Hereinafter, description will be provided assuming that the vehicle 40 is directed toward the front side, a driver seat is on the right side, and a front passenger seat is on the left side.

The vehicle 40 is mounted with on-vehicle equipment, such as a door locking device 42 which performs locking and unlocking of the doors 41 of the vehicle 40. The vehicle 40 is provided with windows 43, such as a front window 43*a*. The front window 43*a* can be formed of a member, such as glass, which easily transmits magnetic flux, and is attached to the upper portion on the front side of the vehicle 40.

The on-vehicle unit 10 and the mobile device 30 can perform radio communication. In the keyless entry system 1, on-vehicle equipment, such as the door locking device 42, is controlled through radio communication between the on-vehicle unit 10 and the mobile device 30, and vehicle operation, such as locking and unlocking of the doors 41 of the vehicle 40, can be performed without using a mechanical key.

Next, the configuration of the on-vehicle unit 10 will be described. As shown in FIG. 1, the on-vehicle unit 10 has an LF transmitter 11, four LF transmission antennas 12 (transmission antennas) connected to the LF transmitter 11, an RF receiver 13, an RF reception antenna 14 connected to the RF receiver 13, a first detector 15, and a first controller 16.

The LF transmitter 11 radio-transmits an LF signal, which is a radio signal (electromagnetic signal) having a frequency (30 kHz to 300 kHz) in a low frequency (LF) band, to the mobile device 30 through the four LF transmission antennas 12. As the LF signal, a radio signal having a frequency in a 120 kHz band, or the like is used. Then, modulation, such as AM modulation, is applied to the LF signal, whereby various instructions or information can be transferred from the on-vehicle unit 10 to the mobile device 30.

The RF receiver 13 receives an RF signal, which is a radio signal (electromagnetic signal) having a frequency (300 MHz to 3 GHz) in an ultrahigh frequency (UHF) band radio-transmitted from the mobile device 30, through the RF reception antenna 14. As the RF signal, a radio signal having a frequency in a 300 MHz band, or the like is used. Then, modulation, such as FM modulation, is applied to the RF signal, whereby various instructions or information can be transferred from the mobile device 30 to the on-vehicle unit 10. The first detector 15 detects the reception signal of the RF receiver 13 and detects various instructions or information included in the RF signal.

The first controller 16 controls various circuits of the on-vehicle unit 10, obtains various instructions or information from a detection signal of the first detector 15, and controls various pieces of on-vehicle equipment of the vehicle 40 based on the obtained instructions or information. The on-vehicle unit 10 is connected to an on-vehicle battery (not shown), and the on-vehicle battery supplies power to various circuits of the on-vehicle unit 10.

Next, the configuration of the mobile device 30 will be described. As shown in FIG. 1, the mobile device 30 has an LF receiver 31, an LF reception antenna 32 connected to the LF receiver 31, a second detector 33, an RF transmitter 34, an RF transmission antenna 35 connected to the RF transmitter 34, two operation switches 36, and a second controller 37.

The LF receiver 31 receives the LF signal radio-transmitted from the on-vehicle unit 10 through the LF reception antenna 32. The second detector 33 detects the reception signal of the LF receiver 31 and detects various instructions or information included in the LF signal. The RF transmitter 34 radio-transmits the RF signal to the on-vehicle unit 10 through the RF transmission antenna 35.

The two operation switches 36 are operation switches for instructing locking and unlocking of the doors 41 of the vehicle 40. As shown in FIGS. 3A and 3B, the two operation switches 36 are arranged to be press-operable at a predetermined position on the upper surface of the mobile device 30.

The second controller 37 controls various circuits of the mobile device 30. A battery (not shown) is embedded in the mobile device 30, and the embedded battery supplies power to various circuits of the mobile device 30.

Figure 4A:
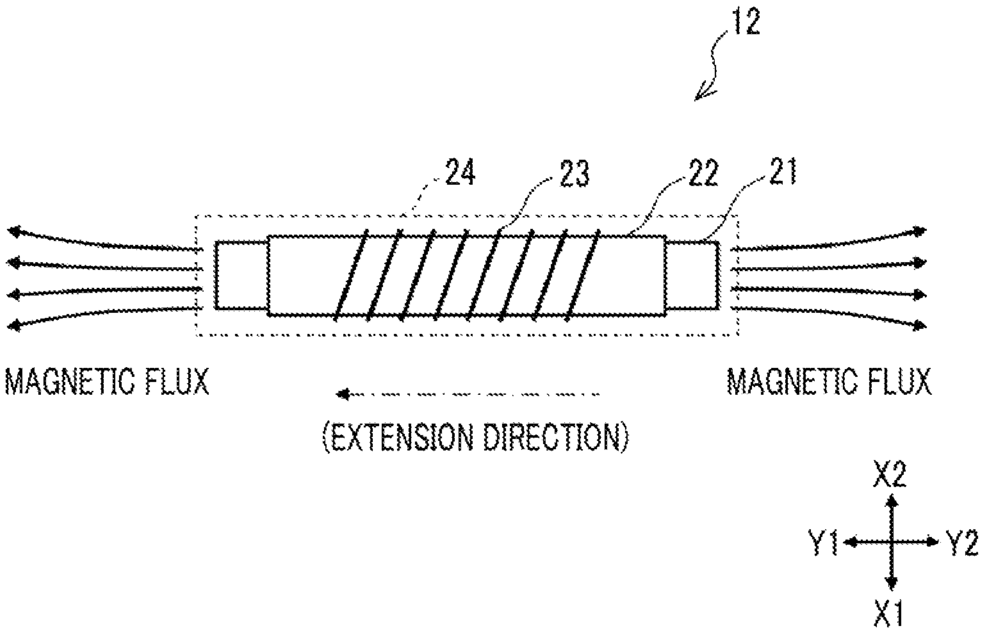
FIGS. 4A and 4B are explanatory views schematically showing the structure of an LF transmission antenna 12 shown in FIG. 1.
Figure 4B:
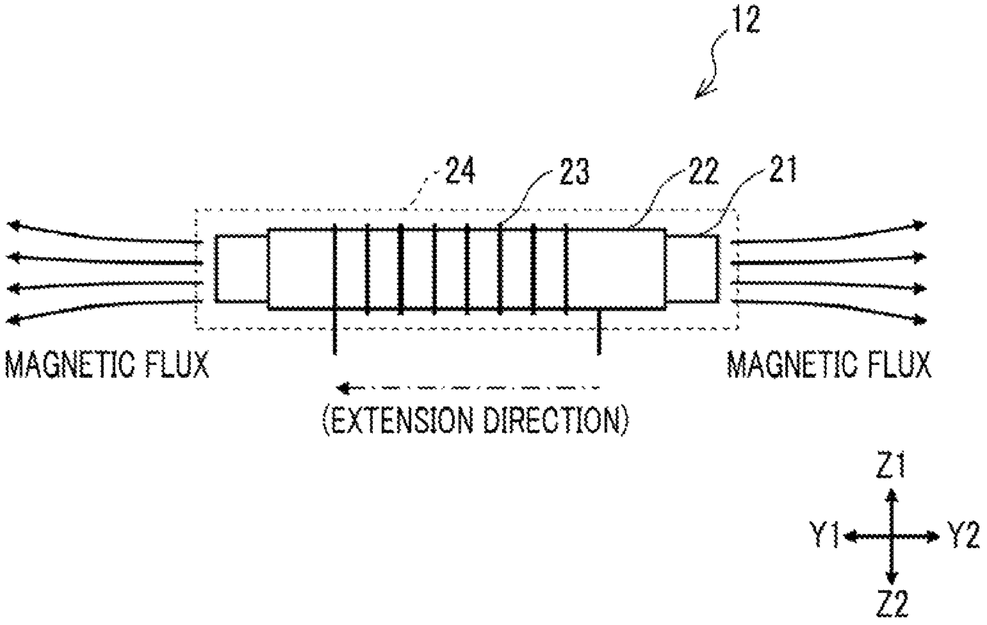

Next, the structure of the LF transmission antenna 12 will be described referring to FIGS. 4A and 4B. FIGS. 4A and 4B are explanatory views schematically showing the structure of the LF transmission antenna 12 shown in FIG. 1. FIG. 4A is a top view and FIG. 4B is a side view.

As shown in FIGS. 4A and 4B, the LF transmission antenna 12 is an elongated columnar antenna. The LF transmission antenna 12 has a ferrite core 21 which extends along the extension direction of the LF transmission antenna 12, a bobbin 22 which covers the ferrite core 21, a coil 23 which is wound around the bobbin 22, and a case member 24 which covers the ferrite core 21, the bobbin 22, and the coil 23.

The LF transmission antenna 12 applies a current to the coil 23 to generate magnetic flux corresponding to the current. The magnetic flux generated by the LF transmission antenna 12 is radiated along the extension direction of the ferrite core 21, that is, the extension direction of the LF transmission antenna 12. The magnetic flux radiated from the LF transmission antenna 12 spreads around the LF transmission antenna 12. The magnetic flux spread around the LF transmission antenna 12 forms a magnetic field around the LF transmission antenna 12. The LF transmitter 11 can radio-transmit the LF signal using the magnetic field formed around the LF transmission antenna 12 in the above-described manner.

In FIGS. 4A and 4B, although the extension direction of the LF transmission antenna 12 is directed toward the front-back direction, when being attached to the vehicle 40, the extension direction of the LF transmission antenna 12 is appropriately changed according to the attachment position.

Figure 5A:
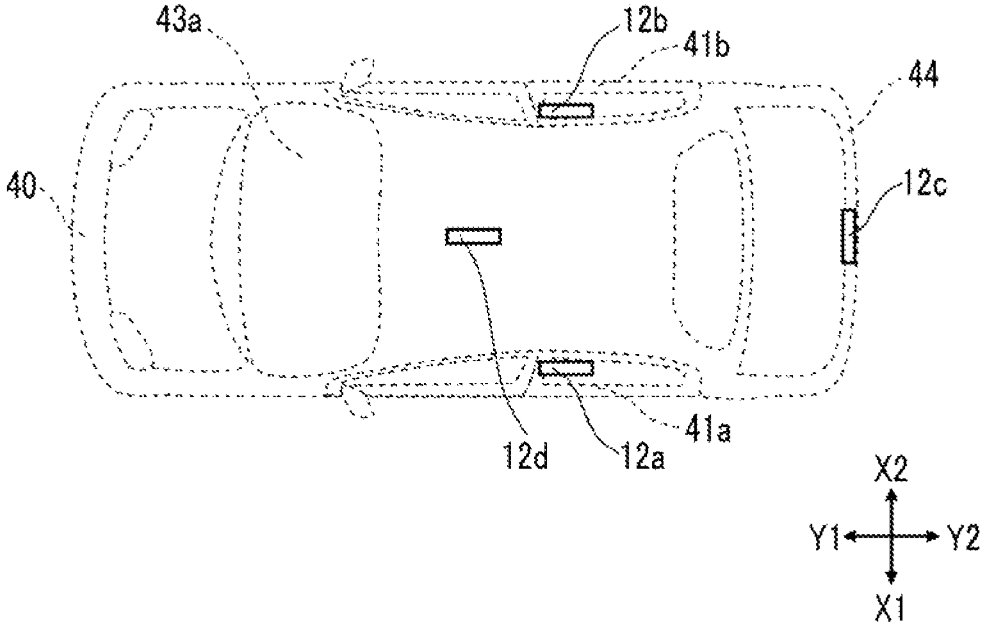
FIGS. 5A and 5B are explanatory views schematically showing the arrangement of the LF transmission antennas 12 shown in FIG. 1.
Figure 5B:
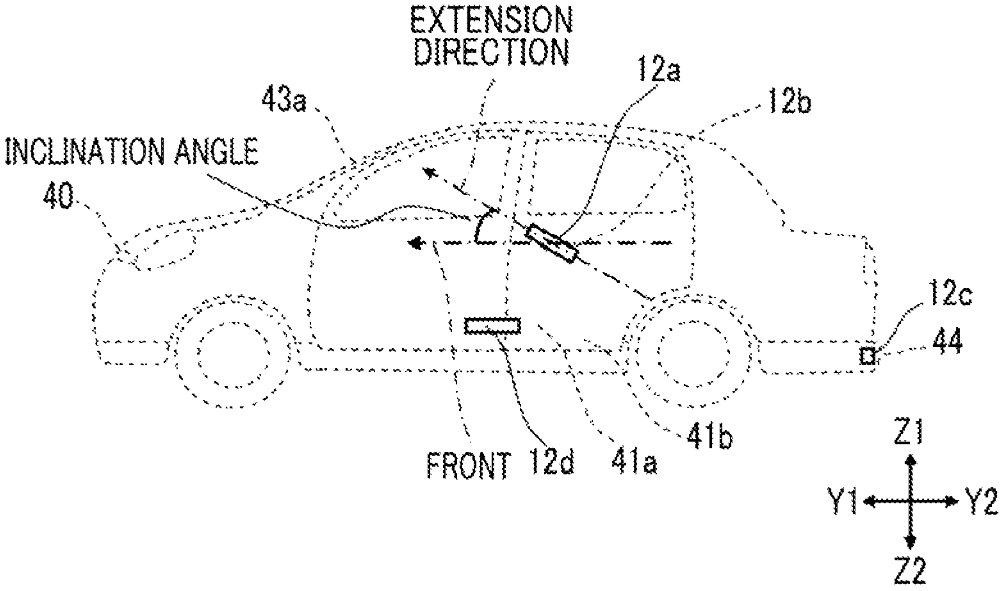
Figure 6A:
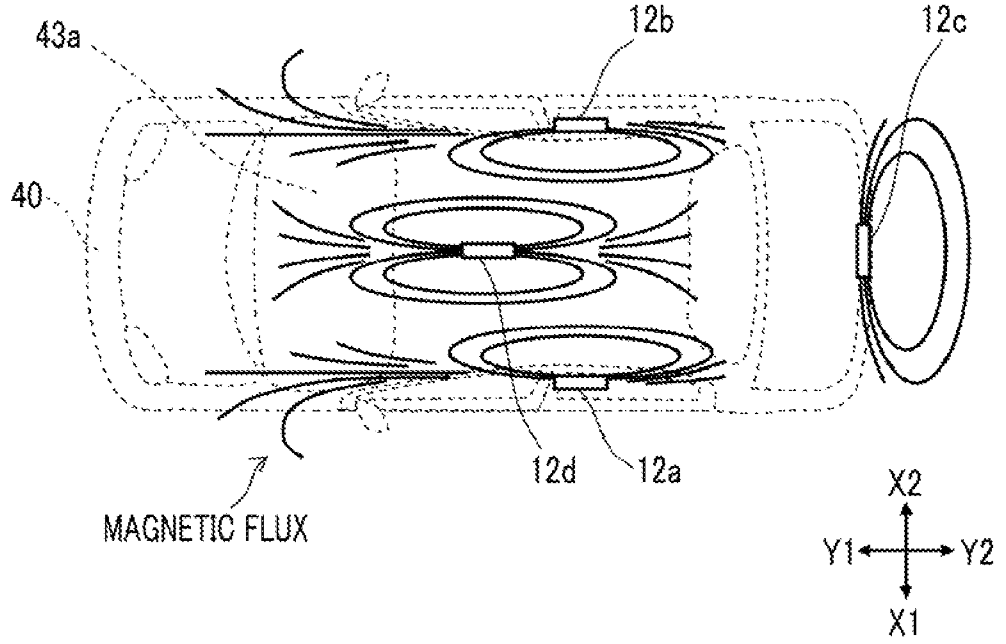
FIGS. 6A and 6B are explanatory views schematically showing magnetic flux radiated from the LF transmission antennas 12 shown in FIG. 1.
Figure 6B:
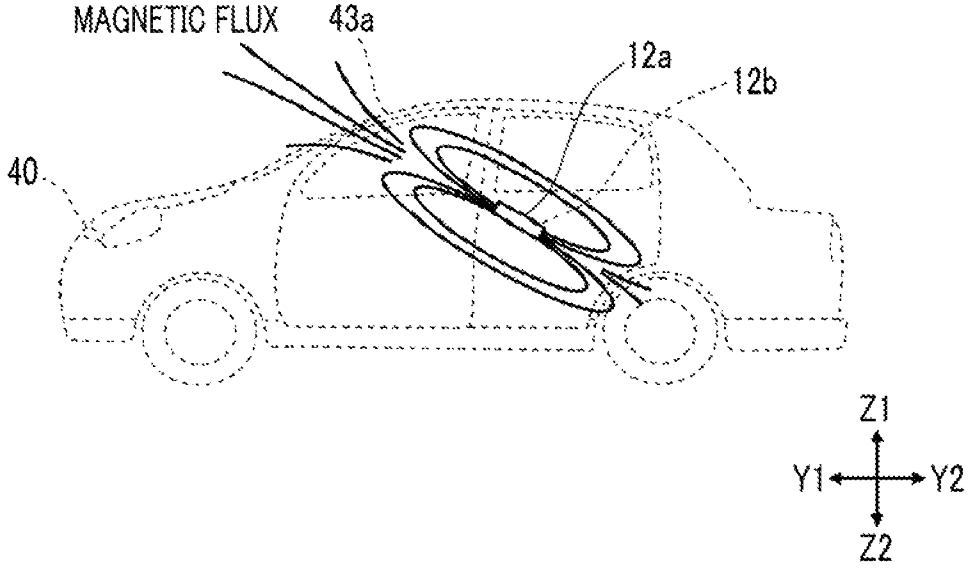
Figure 7:
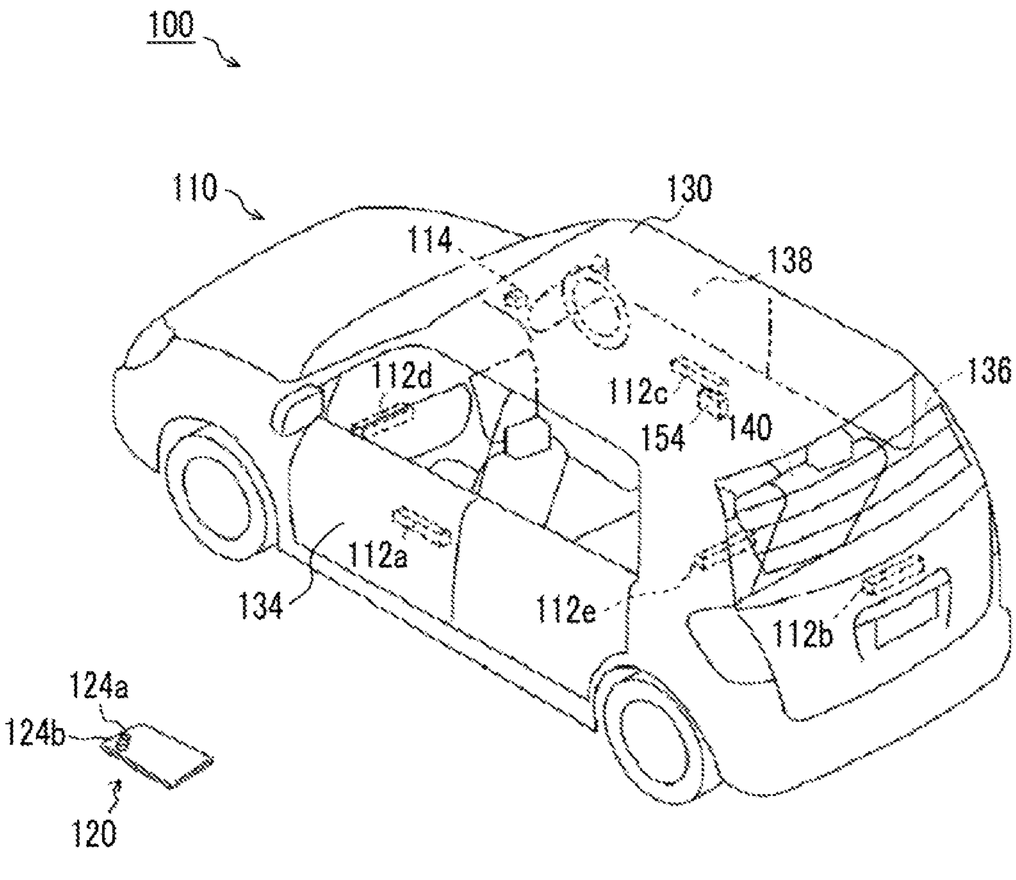
FIG. 7 is an explanatory view showing the configuration of a smart keyless entry system 100 described in Japanese Unexamined Patent Application Publication No. 2009-19439.
Figure 8:
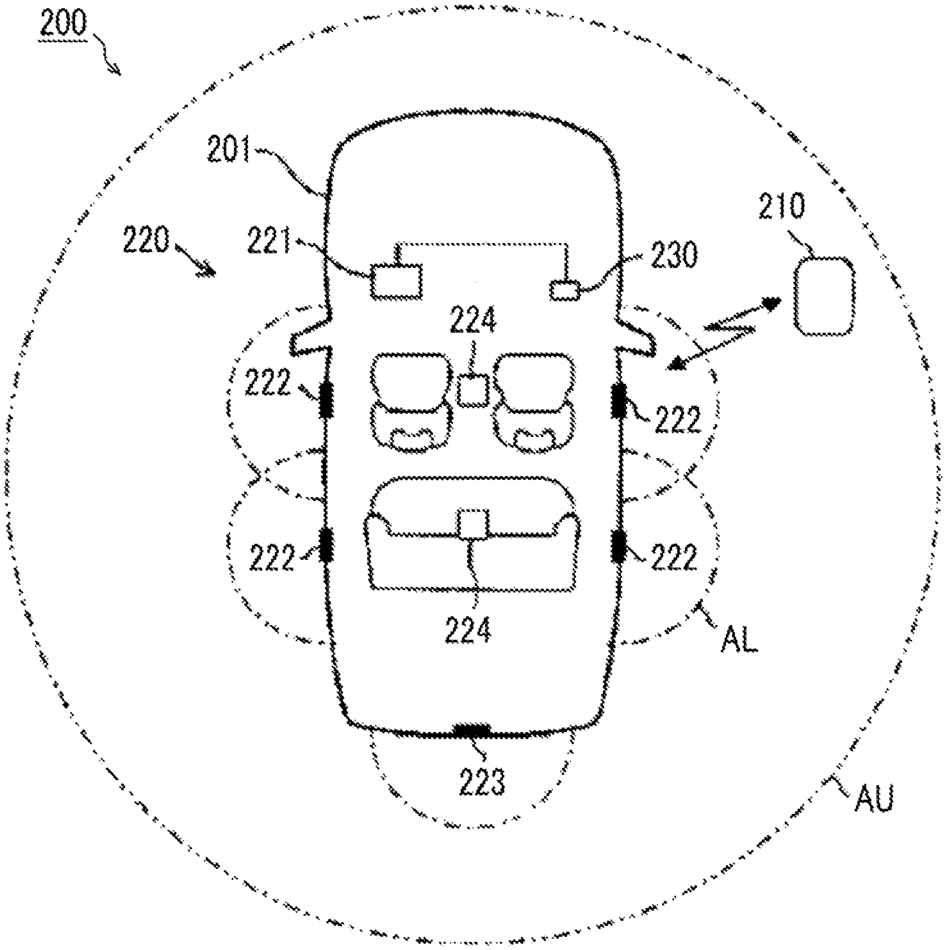
FIG. 8 is an explanatory view showing the configuration of a smart entry system 200 described in Japanese Unexamined Patent Application Publication No. 2003-269023.

Next, the arrangement of the LF transmission antennas 12 will be described referring to FIGS. 5A, 5B, 6A, and 6B. FIGS. 5A and 5B are explanatory views schematically showing the arrangement of the LF transmission antennas 12 shown in FIG. 1. FIG. 5A is a top view and FIG. 5B is a side view. FIGS. 6A and 6B are explanatory views schematically showing magnetic flux radiated from the LF transmission antennas 12 shown in FIG. 1. FIG. 6A is a top view and FIG. 6B is a side view.

As shown in FIGS. 5A and 5B, the four LF transmission antennas 12 are arranged in the vehicle interior of a rear seat-side left door 41*a* (left door) among the doors 41 of the vehicle 40, in the vehicle interior of a rear seat-side right door 41*b* (right door) among the doors 41 of the vehicle 40, in the vehicle interior of a rear bumper 44 of the vehicle 40, and in the vicinity of a vehicle interior center console box (not shown) of the vehicle 40.

Hereinafter, description will be provided while the LF transmission antenna 12 arranged in the vehicle interior of the rear seat-side left door 41*a* among the four LF transmission antennas 12 is referred to as a first transmission antenna 12*a*, the LF transmission antenna 12 arranged in the vehicle interior of the rear seat-side right door 41*b* of the vehicle 40 is referred to as a second transmission antenna 12*b*, the LF transmission antenna 12 arranged inside the rear bumper 44 of the vehicle 40 is referred to as a third transmission antenna 12*c*, and the LF transmission antenna 12 arranged in the vehicle interior of the vehicle 40 is referred to as a fourth transmission antenna 12*d*.

The first transmission antenna 12*a* is arranged between the outer wall and the inner wall of the rear seat-side left door 41*a* and is attached such that the extension thereof is a direction inclined upward with respect to the front side. For this reason, the radiation direction of magnetic flux radiated from the first transmission antenna 12*a* is a direction inclined upward with respect to the front side. The magnetic flux radiated from the first transmission antenna 12*a* is radiated outside the vehicle 40 through the front window 43*a* of the vehicle 40 ahead in the radiation direction. The inner wall of the rear seat-side left door 41*a* is formed of a member, such as synthetic resin, which easily transmits magnetic flux.

The second transmission antenna 12*b* is arranged between the outer wall and the inner wall of the rear seat-side right door 41*b* and is attached such that the extension direction thereof is a direction inclined upward with respect to the front side. For this reason, the radiation direction of magnetic flux radiated from the second transmission antenna 12*b* is a direction inclined upward with respect to the front side. The magnetic flux radiated from the second transmission antenna 12*b* is radiated outside the vehicle 40 through the front window 43*a* of the vehicle 40. The inner wall of the rear seat-side right door 41*b* is formed of a member, such as synthetic resin, which easily transmits magnetic flux.

In this way, the magnetic flux radiated outside the vehicle 40 through the front window 43*a* of the vehicle 40 forms a magnetic field on the front side of the vehicle 40, and turns into the vicinity of the doors 41 of the vehicle 40 to form a magnetic field in the vicinity of the doors 41 of the vehicle 40. Then, it is possible to allow the LF signal to reach a predetermined distance on the front side of the vehicle 40 and in the vicinity of the doors 41 using the magnetic field formed on the front side of the vehicle 40 and in the vicinity of the doors 41.

The third transmission antenna 12*c* is attached such that the extension direction thereof is a right-left direction. For this reason, the radiation direction of magnetic flux radiated from the third transmission antenna 12*c* is the right-left direction. The magnetic flux radiated from the third transmission antenna 12*c* forms a magnetic field on the rear side of the vehicle 40. Then, it is possible to allow the LF signal to reach a predetermined distance on the rear side of the vehicle 40 using the magnetic field formed on the rear side of the vehicle 40.

The fourth transmission antenna 12*d* is attached such that the extension direction thereof is a front-rear direction. For this reason, the radiation direction of magnetic flux radiated from the fourth transmission antenna 12*d* is the front-rear direction. The magnetic flux radiated from the fourth transmission antenna 12*d* is used when radio-transmitting the LF signal to the vehicle interior of the vehicle 40.

Next, a communication function according to this embodiment will be described. In the keyless entry system 1, an LF signal is radio-transmitted from the on-vehicle unit 10 to the mobile device 30, and an RF signal is radio-transmitted from the mobile device 30 to the on-vehicle unit 10, whereby radio communication can be performed between the on-vehicle unit 10 and the mobile device 30. Then, in the keyless entry system 1, various instructions or information can be transferred between the on-vehicle unit 10 and the mobile device 30 through radio communication between the on-vehicle unit 10 and the mobile device 30.

In this embodiment, an LF signal including a wakeup signal is radio-transmitted from the on-vehicle unit 10 to the mobile device 30 through radio communication between the on-vehicle unit 10 and the mobile device 30. The wakeup signal is a signal for activating a predetermined function of the mobile device 30. Typically, when the mobile device 30 is not used, a majority of functions of the mobile device 30 excluding some functions, such as a reception function, are stopped (sleep state). When the LF signal including the wakeup signal is received from the on-vehicle unit 10, the mobile device 30 activates the functions being stopped and can perform radio communication with the on-vehicle unit 10 (wakeup state).

In this embodiment, an RF signal including a command signal is radio-transmitted from the mobile device 30 to the on-vehicle unit 10 through radio communication between the on-vehicle unit 10 and the mobile device 30. The command signal is a signal for performing an instruction relating to locking and unlocking of the doors 41 of the vehicle 40. When the mobile device 30 receives the LF signal including the wakeup signal, the RF signal including the command signal corresponding to the wakeup signal is radio-transmitted from the mobile device 30. When the operation switches 36 of the mobile device 30 are press-operated, an RF signal including a command signal corresponding to press-operation is radio-transmitted from the mobile device 30.

Hereinafter, a state in which the mobile device 30 can receive the LF signal radio-transmitted from the on-vehicle unit 10, and the on-vehicle unit 10 can receive the RF signal radio-transmitted from the mobile device 30 is referred to as a state in which the on-vehicle unit 10 and the mobile device 30 are communicable. The distance for maintaining the state in which the on-vehicle unit 10 and the mobile device 30 are communicable is referred to as the communication distance between the on-vehicle unit 10 and the mobile device 30. Typically, the incoming distance of the LF signal radio-transmitted from the on-vehicle unit 10 is set to be shorter than the incoming distance of the RF signal radio-transmitted from the mobile device 30. For this reason, the communication distance between the on-vehicle unit 10 and the mobile device 30 is limited by the incoming distance of the LF signal radio-transmitted from the on-vehicle unit 10.

Next, vehicle operation according to this embodiment will be described. In the keyless entry system 1, vehicle operation, such as locking and unlocking of the doors 41 of the vehicle 40, is performed through radio communication between the on-vehicle unit 10 and the mobile device 30.

Unlocking of the doors 41 of the vehicle 40 is automatically performed when the user 50 carries the mobile device 30 and approaches the vehicle 40. In this embodiment, first, the on-vehicle unit 10 radio-transmits the LF signal including the wakeup signal regularly. If the user 50 approaches the vehicle 40 and the distance between the on-vehicle unit 10 and the mobile device 30 is within the range of the communication distance, the mobile device 30 can receive the LF signal. Then, the mobile device 30 radio-transmits the RF signal including the command signal corresponding to the wakeup signal, and when the on-vehicle unit 10 receives the RF signal, unlocking of the doors 41 of the vehicle 40 is automatically performed.

Locking of the doors 41 of the vehicle 40 is automatically performed when the user 50 carries the mobile device 30 and moves away from the vehicle 40. In this embodiment, if the user 50 gets out of the vehicle 40 and moves away from the vehicle 40, and the distance between the on-vehicle unit 10 and the mobile device 30 is outside the range of the communication distance, even if the on-vehicle unit 10 radio-transmits the LF signal including the wakeup signal, the mobile device 30 cannot receive the LF signal. Then, when the RF signal corresponding to the wakeup signal is not radio-transmitted from the mobile device 30, locking of the doors 41 of the vehicle 40 is automatically performed.

In this embodiment, locking or unlocking of the doors 41 of the vehicle 40 may be performed by press-operating the operation switches 36 of the mobile device 30. In this embodiment, when vehicle operation, such as locking and unlocking of the doors 41 of the vehicle 40, is performed, collation of ID information is performed between the on-vehicle unit 10 and the mobile device 30. Detailed description of a method for vehicle operation using the operation switches 36 or a collation method of ID information will be omitted.

Next, the effects of this embodiment will be described. For example, when the user 50 takes out baggage after getting out of the vehicle 40, each time the user 50 slightly moves away from or approaches the vehicle 40, locking and unlocking of the doors 41 of the vehicle 40 is repeated, and the baggage is not easily taken out. For this reason, it is desirable that locking of the doors 41 of the vehicle 40 is not performed until the user 50 completely moves away from the vehicle 40. To this end, it is desirable to extend the communication distance between the on-vehicle unit 10 and the mobile device 30 on the outside of the vehicle 40, that is, the incoming distance of the LF signal radio-transmitted from the on-vehicle unit 10 to about 1 to 2 m or more from the vehicle 40.

In contrast, in the keyless entry system 1 of this embodiment, the first transmission antenna 12*a* among the four LF transmission antennas 12 is arranged in the vehicle interior of the rear seat-side left door 41*a* and is attached such that radiating magnetic flux passes through the front window 43*a* of the vehicle 40. The second transmission antenna 12*b* is arranged in the vehicle interior of the rear seat-side right door 41*b* and is attached such that radiating magnetic flux passes through the front window 43*a* of the vehicle 40. For this reason, a magnetic field can be formed on the outside of the vehicle 40 by the magnetic flux radiated to the outside of the vehicle 40 through the front window 43*a* of the vehicle 40. Then, it is possible to extend the communication distance on the outside of the vehicle 40 using the magnetic field formed on the outside of the vehicle 40.

In the keyless entry system 1 of this embodiment, since the communication distance on the outside of the vehicle 40 is extended using the first transmission antenna 12*a* and the second transmission antenna 12*b* arranged in the vehicle interior of the doors 41 of the vehicle 40, it is not necessary to provide the LF transmission antennas 12 in the door knobs of the doors 41 of the vehicle 40. As a result, in the keyless entry system 1, it is possible to extend the communication distance on the outside of the vehicle 40 while maintaining the degree of freedom for design of the door knob.

In the vehicle 40 in which the keyless entry system 1 of this embodiment is used, the front window 43*a* of the vehicle 40 is arranged in the upper portion on the front side of the vehicle 40. For this reason, when the first transmission antenna 12*a* and the second transmission antenna 12*b* radiate magnetic flux to the front side, a majority of radiated magnetic flux is directed toward the lower side than the front window 43*a*, and the amount of magnetic flux to be radiated to the outside of the vehicle 40 decreases.

However, in the keyless entry system 1 of this embodiment, the first transmission antenna 12*a* and the second transmission antenna 12*b* radiate magnetic flux in the direction inclined upward with respect to the front side. For this reason, it is possible to increase the amount of magnetic flux to be radiated to the outside of the vehicle 40 through the front window 43*a* and to extend the communication distance on the outside of the vehicle 40.

In the keyless entry system 1 of this embodiment, if the inclination angle of the radiation direction of magnetic flux radiated from the first transmission antenna 12*a* and the second transmission antenna 12*b* with respect to the front side is excessively small, a majority of magnetic flux radiated from the first transmission antenna 12*a* and the second transmission antenna 12*b* is directed toward the lower side than the front window 43*a* of the vehicle 40, and the amount of magnetic flux to be radiated to the outside of the vehicle 40 decreases. Although the tendency somewhat changes depending on design of the vehicle 40, the attachment position of the first transmission antenna 12*a*, or the like, in particular, when the inclination angle is less than 20 degrees, the tendency is conspicuous.

If the inclination angle is excessively large, a majority of magnetic flux radiated from the first transmission antenna 12*a* and the second transmission antenna 12*b* is directed to the upper side than the front window 43*a* of the vehicle 40, and the amount of magnetic flux to be radiated to the outside of the vehicle 40 decreases as well. Although the tendency somewhat changes depending on design of the vehicle 40, the attachment position of the second transmission antenna 12*b*, or the like, in particular, when the inclination angle is greater than 40 degrees, the tendency is conspicuous. For this reason, it is desirable that the inclination angle of the radiation direction of magnetic flux radiated from the first transmission antenna 12*a* and the second transmission antenna 12*b* with respect to the front side is in a range of 20 degrees to 40 degrees.

Although the embodiment of the invention has been described, the invention is not limited to the above-described embodiment, and may be appropriately changed without departing from the scope of the object of the invention.

For example, in the embodiment of the invention, the LF transmission antennas 12 may be antennas having a structure other than the above-described structure insofar as magnetic flux can be radiated in a predetermined direction. The first transmission antenna 12*a* may be arranged in the vehicle interior of a front passenger seat-side door 41 (left door), instead of the vehicle interior of the rear seat-side left door 41*a*. The second transmission antenna 12*b* may be arranged in the vehicle interior of a driver seat-side door 41 (right door), instead of the vehicle interior of the rear seat-side right door 41*b* (right door).

In the embodiment of the invention, the number of LF transmission antennas 12 which are attached such that radiating magnetic flux passes through the front window 43*a* of the vehicle 40 may be equal to or greater than three, and the communication between the on-vehicle unit 10 and the mobile device 30 may be further extended. If the communication distance on the driver seat side should only be extended, the number of LF transmission antennas 12 which are attached such that radiating magnetic flux passes through the front window 43*a* of the vehicle 40 may be one.

In the embodiment of the invention, the LF transmission antennas 12 may be attached such that radiating flux passes through the window 43 other than the front window 43*a* of the vehicle 40 insofar as a predetermined function can be realized. For example, the LF transmission antennas 12 may be attached such that magnetic flux is radiated in a direction inclined upward with respect to the rear side, and the magnetic flux radiated from the LF transmission antennas 12 may pass through the rear window of the vehicle 40. The LF transmission antennas 12 may be attached such that magnetic flux is radiated in a direction inclined upward with respect to the right-left direction, and magnetic flux radiated from the LF transmission antennas 12 may pass through the side windows of the vehicle 40.

In the embodiment of the invention, the first transmission antenna 12*a* may be arranged in the vehicle interior of a center pillar portion of the rear seat-side left door 41*a*. In this case, the first transmission antenna 12*a* may be attached to radiate magnetic flux to the front side. The second transmission antenna 12*b* may be arranged in the vehicle interior of a center pillar portion of the rear seat-side right door 41*b*. In this case, the second transmission antenna 12*b* may be attached to radiate magnetic flux to the front side.

In the embodiment of the invention, the on-vehicle unit 10 may radio-transmit a signal having a frequency other than an LF band to the mobile device 30 insofar as a predetermined function can be realized. In this case, a transmitter and transmission antennas corresponding to the frequency of the signal to be radio-transmitted may be used, instead of the LF transmitter 11 and the LF transmission antennas 12. The mobile device 30 may radio-transmit a signal having a frequency other than a UHF band to the on-vehicle unit 10.

In the embodiment of the invention, vehicle operation other than locking and unlocking of the doors 41 may be performed through radio communication between the on-vehicle unit 10 and the mobile device 30. For example, turning on a welcome light for turning on a light if the user 50 approaches the vehicle 40, the start and stop of the engine of the vehicle 40, or the like may be performed through radio communication between the on-vehicle unit 10 and the mobile device 30.

It should be understood by those skilled in the art that various modifications, combinations, sub-combinations and alterations may occur depending on design requirements and other factors insofar as they are within the scope of the appended claims of the equivalents thereof.

What is claimed is:

1. A keyless entry system for controlling on-vehicle equipment mounted in a vehicle through radio communication, the keyless entry system comprising:

an on-vehicle unit mounted in a vehicle;

a mobile device configured to perform radio communication with the on-vehicle unit, wherein the on-vehicle unit comprises a plurality of transmission antennas for radio-transmitting a signal to the mobile device, the plurality of transmission antennas including at least one antenna disposed on a vehicle interior side of a door of the vehicle such that magnetic flux radiated from the antenna passes through a window of the vehicle, wherein the plurality of transmission antennas include:

at least one first antenna disposed between an outer wall and an inner wall of a left side door of the vehicle; and at least one second antenna disposed between an outer wall and an inner wall of a right side door of the vehicle, and wherein magnetic flux radiated from the first and second antennas has a direction inclined upward with respect to a direction toward a front of the vehicle from a rear thereof.

2. The keyless entry system according to claim 1, wherein the direction of the magnetic flux radiated from the first and second antennas has an inclination angle in a range of 20 degrees to 40 degrees with respect to the direction toward the front of the vehicle from the rear thereof.

3. The keyless entry system according to claim 1, wherein the first and second antennas are arranged such that the magnetic flux radiated therefrom passes through a windshield of the vehicle.

* * * * *